No. 699,556. Patented May 6, 1902.
J. J. OLINGER.
PLANTER.
(Application filed Dec. 23, 1901.)
(No Model.)
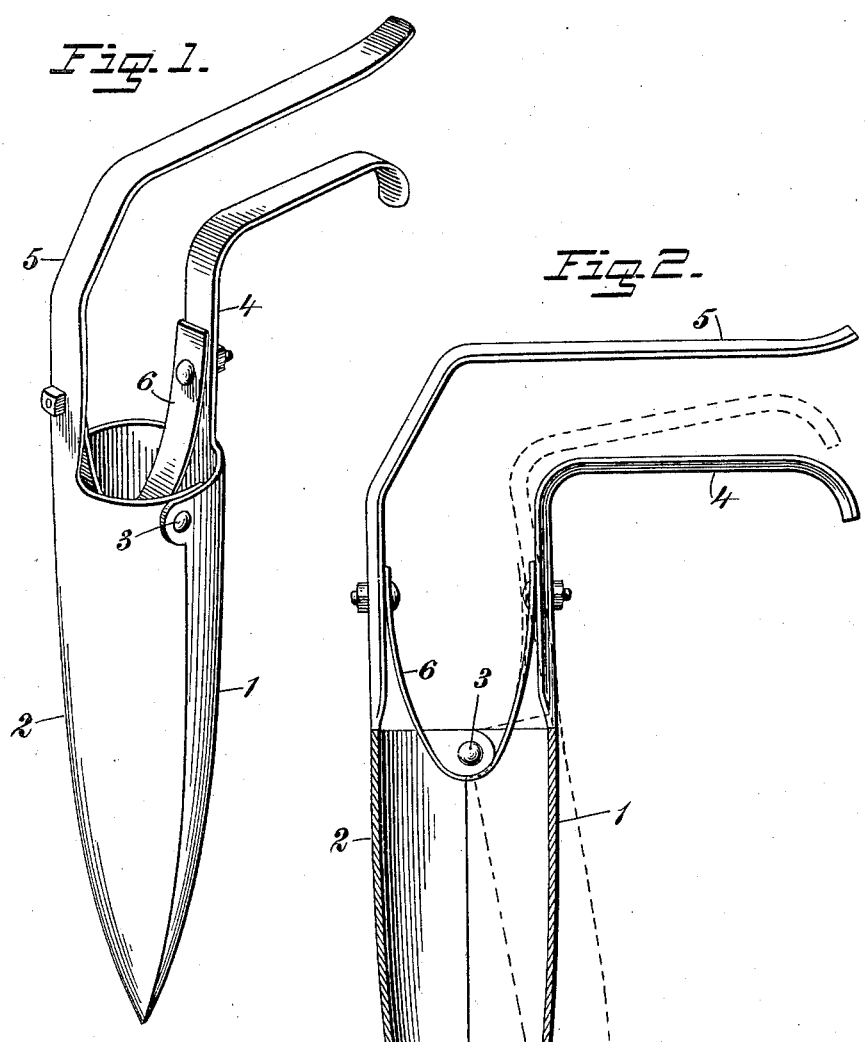
WITNESSES:
INVENTOR
John J. Olinger
BY
ATTORNEYS

UNITED STATES PATENT OFFICE.

JOHN J. OLINGER, OF NEW YORK, N. Y.

PLANTER.

SPECIFICATION forming part of Letters Patent No. 699,556, dated May 6, 1902.

Application filed December 23, 1901. Serial No. 86,941. (No model.)

*To all whom it may concern:*

Be it known that I, JOHN J. OLINGER, a citizen of the United States, and a resident of the city of New York, borough of Manhattan, in the county and State of New York, have invented certain new and useful Improvements in Planters, of which the following is a full, clear, and exact description.

This invention relates to improvements in devices for transplanting, inserting, and removing plants from the ground and for inserting fertilizer with the plants or inserting fertilizer at the sides of the plant-roots; and the object is to provide a device of this character of simple construction and that may be readily operated by one hand of a person.

I will describe a planter embodying my invention and then point out the novel features in the appended claim.

Reference is to be had to the accompanying drawings, forming a part of this specification, in which similar characters of reference indicate corresponding parts in both the figures.

Figure 1 is a perspective view of a planter embodying my invention, and Fig. 2 is a longitudinal section thereof.

The planter comprises two jaws 1 2, each being substantially semicircular and tapered to a point at one end. At the upper end the two jaw members are pivoted together, as indicated at 3, and when the said jaw members are closed they form a continuous round body, which may be easily inserted in the ground. Extending from the jaw members 1 2 are the handles 4 5, these handles extending upward for a portion of their length and then laterally at right angles to the body of the device, so as to be readily grasped by one hand of a person. The jaws are held normally closed together by means of a spring 6, secured to the handles 4 and 5.

In using this device the plants may be placed therein when it is closed, and then after forcing the device into the ground the jaws are spread apart by pressure on the handles, and upon withdrawing the jaws from the ground the plant will be left in the ground. It is obvious that at the same time of inserting a plant a fertilizer may be also inserted, or fertilizer alone may be inserted at the side of a plant or its roots. I am aware that devices for this purpose have heretofore been made; but such devices are large and are designed to be operated by two hands or are designed to be forced into the ground by foot-pressure.

Having thus described my invention, I claim as new and desire to secure by Letters Patent—

A planter, comprising two semicircular jaws tapered to a point at one end, a pivotal connection between the jaws at the upper end, handles extending from the jaws, portions of said handles being projected laterally one above the other, and a spring for normally holding the jaws closed.

In testimony whereof I have signed my name to this specification in the presence of two subscribing witnesses.

JOHN J. OLINGER.

Witnesses:
JNO. M. RITTER,
C. R. FERGUSON.